United States Patent [19]

Hisano et al.

[11] Patent Number: 5,201,012
[45] Date of Patent: Apr. 6, 1993

[54] IMAGE BINARIZATION THRESHOLD COMPUTING APPARATUS

[75] Inventors: Atushi Hisano, Nagaokakyo; Hiroshi Teramoto, Jyoyo; Atushi Mizoguchi, Hikone; Hiroshi Hisada, Moriyama; Siro Fujieda, Otokuni, all of Japan

[73] Assignee: Omron Corporation, Kyoto, Japan

[21] Appl. No.: 712,189

[22] Filed: Jun. 5, 1991

[30] Foreign Application Priority Data

Jun. 8, 1990 [JP] Japan .................... 1-150490
Apr. 17, 1991 [JP] Japan .................... 2-112636

[51] Int. Cl.$^5$ ............................. G06K 9/00
[52] U.S. Cl. .......................... 382/50; 382/51; 358/466
[58] Field of Search ............ 382/50, 51, 22, 1; 358/464, 453, 465, 466

[56] References Cited

U.S. PATENT DOCUMENTS 4,959,869 9/1990 Hongo ..................... 382/51
5,027,413 6/1991 Barnard ..................... 382/1

FOREIGN PATENT DOCUMENTS 64-51586 2/1989 Japan ..................... 382/50

OTHER PUBLICATIONS

Patent Abstracts of Japan, vol. 13, No. 253 (P-883) (3601), Jun. 13, 1989.

Primary Examiner—Michael T. Razavi
Assistant Examiner—Yon Jung
Attorney, Agent, or Firm—Dickstein, Shapiro & Morin

[57] ABSTRACT

This invention relates to an image binarization threshold computing apparatus comprising a window scanning means for setting a window of predetermined area over a multilevel image and scanning the same image, a first information generating means for generating a first data on brightness of the image within the window, a second information generating means for generating a second data on fitness of the image within the window with respect to a preset pattern, a third information generating means for generating a third data serving as a picture quality assessment criterion from the first and second data, and an optimal threshold computing means for calculating the optimal threshold value providing the best picture quality according to the third data.

4 Claims, 7 Drawing Sheets

FIG. 4 pi : Picture element qi : Density difference from po

FIG. 5

| N | N | Z |
|---|---|---|
| N |   | P |
| Z | P | P |

Direction 1
A

| N | Z | P |
|---|---|---|
| N |   | P |
| N | Z | P |

Direction 2
B

| Z | P | P |
|---|---|---|
| N |   | P |
| N | N | Z |

Direction 3
C

| P | P | P |
|---|---|---|
| Z |   | Z |
| N | N | N |

Direction 4
D

| P | P | Z |
|---|---|---|
| P |   | N |
| Z | N | N |

Direction 5
E

| P | Z | N |
|---|---|---|
| P |   | N |
| P | Z | N |

Direction 6
F

| Z | N | N |
|---|---|---|
| P |   | N |
| P | P | Z |

Direction 7
G

| N | N | N |
|---|---|---|
| Z |   | Z |
| P | P | P |

Direction 8
H

IMAGE BINARIZATION THRESHOLD COMPUTING APPARATUS

BACKGROUND OF THE INVENTION

1. Field of the Invention

The present invention relates to an image processing system for the eyes of an intelligence robot or an optical inspection device and more particularly to an image binarization threshold computing system which is used in calculation of a threshold value for deriving the optimum binary image from a multilevel image such as a density image or a distance image.

2. Description of the Prior Art

The present applicant previously proposed a system for computing the optimum threshold value for binarization of a multilevel image in Japanese Patent Application No. 62- 208849/1987.

In that system, a window is positioned on a multilevel image and, with the brightness of a picture element in a specific location within the window being used as a reference, it is reasoned by the binary logic whether the binary image pattern in the whole window area that can be obtained on binarization of the other elements within the window will be a smooth-edged pattern (valid pattern). The results of such reasoning are accumulated for each brightness level of reference picture elements. As the whole image area is scanned with the window, the above reasoning and cumulation procedures are repeated until the whole image area is covered.

For normalization, a histogram of brightness is constructed from cumulative values for the respective brightness levels of picture elements over the entire image area and then a histogram of picture quality is generated by division. Finally, the brightness corresponding to the minimum value in this picture quality histogram is chosen as the optimum binarization threshold value.

Thus, as a candidate binarization threshold value for improving the picture quality, the picture quality within the window is regionally evaluated using the picture element in a given location within the window as a reference, results of such evaluation are accumulated over the entire image area, and the optimum binarization threshold value is calculated using the cumulative values.

A binary image of good picture quality is an image such that the edges of the white and black picture elements are not serrated but continuous and smooth. The optimum threshold value is the threshold value which gives the best picture quality on binarization.

The apparatus previously proposed as above, are advantageous in that, unlike the p-tile method, it is applicable even where the size of the subject is unknown and that it does not require a time-consuming arithmetic operation as in the case of Ohtsu's threshold method.

However, the previously proposed apparatus cannot provide a smooth histogram of picture quality and, therefore, requires a smoothing operation for deriving the minimum value. For his reason, the apparatus cannot detect a delicate threshold value. Another disadvantage of the apparatus is that the histogram of picture quality changes every time a new image data is introduced.

In light of the above, the present invention enables not only delicate detection of the binarization threshold value without need for smoothing operation but permits generating of a stable histogram of picture quality.

SUMMARY OF THE INVENTION

The image binarization threshold computing apparatus of the present invention comprises a window scanning means for setting a window of predetermined range on a multilevel image and scanning the image, a first information generating means for generating a first data relating to brightness of the image within the window, a second information generating means for generating a second data relating to fitness of the image within the window relative to a preset pattern, a third information generating means for generating a third data providing a criterion for evaluation of picture quality from said first and second data, and an optional threshold computing means for computing the optimal threshold value providing the best picture quality according to said third data.

In the image binarization threshold computing apparatus thus constructed, the evaluation is not a binary judgement on, for example, an image edge with respect to a model pattern but an assessment of non-fitness inclusive of the intermediate information.

Therefore, a smooth picture quality histogram can be obtained. Consequently, the smoothing operation can be dispensed with and a delicate threshold detection and generation of a stable histogram can be made feasible.

DESCRIPTION OF THE PREFERRED EMBODIMENTS

Figure 2:
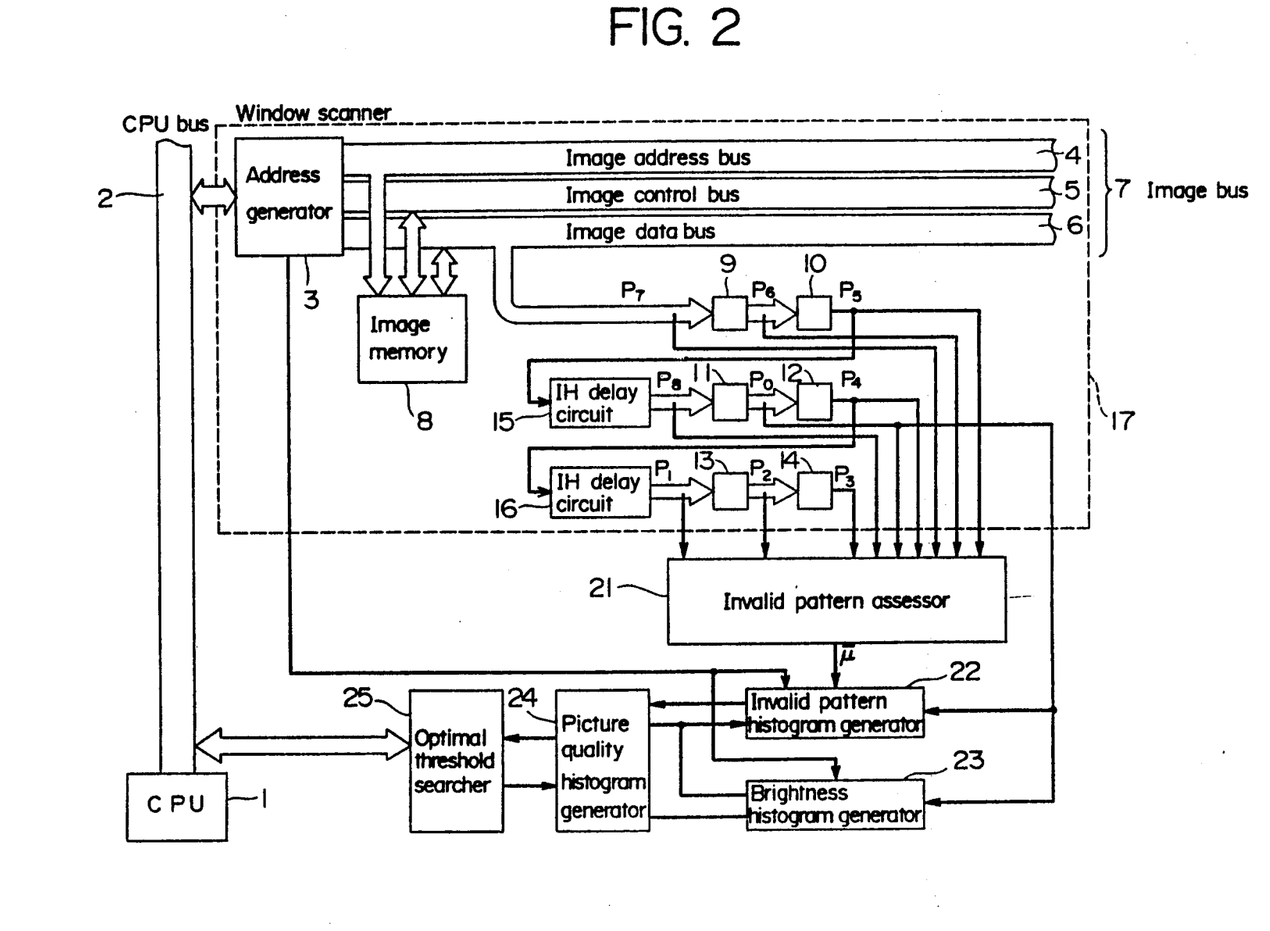
FIG. 2 is a block diagram showing the configuration of an example of the image binarization threshold calculator of the invention.

FIG. 2 is a block diagram representing the construction of an image binarization threshold computing apparatus embodying the principles of the present invention.

CPU 1 controls an address generator 3 through a CPU bus 2 so as to generate a control signal, a timing signal, etc. for application to the corresponding circuits and means. In an image memory 8 where write and read are controlled by control signal input through an image control bus 5, the data supplied from an image data bus 6 is written and read at the address designated through an image address bus 4. An image data bus 7 consisting of said image address bus 4, image control bus 5 and image data bus 6 is connected to other circuits not shown as well.

In the image memory 8, a multilevel image data per field (or frame) (the data in the picture frame 31 shown in FIG. 3), for instance, is written. Of the data written into the image memory 8, the data on a predetermined area (the portion designated by a scanning window 3 in FIG. 32) is read and fed successively to latch circuits 9, 10, a 1H delay circuit 15, latch circuits 11, 12, a 1H delay circuit 16, and latch circuits 13, 14. The 1H delay circuits 15, 16 each delays the input data by 1H and outputs it, while the latch circuits 9 through 14 latch the input data.

Figure 3:
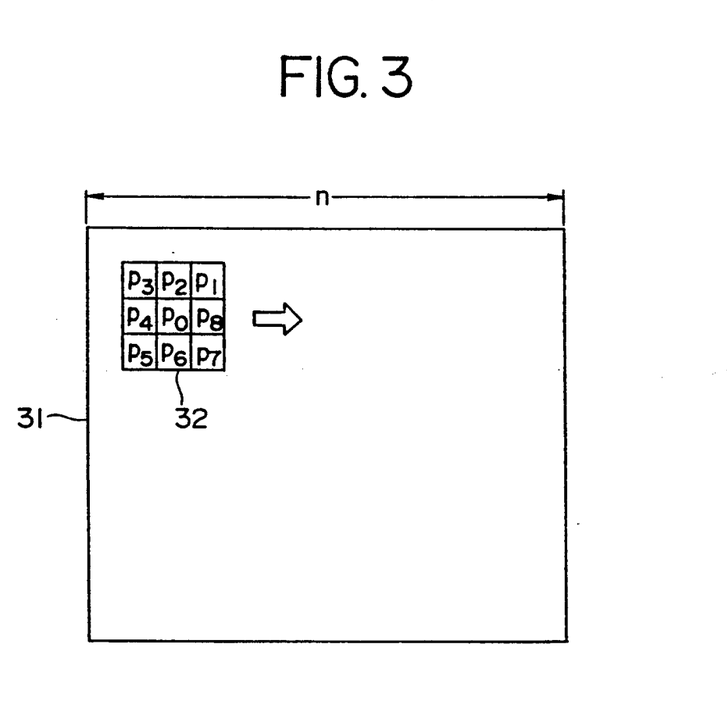
FIG. 3 is a front view of the image area which explains the operation of the embodiment shown in FIG. 2.

As illustrated in FIG. 3, the data on N (N=9 in this embodiment) picture elements, e.g. p0 through p8, which are designated by the window 32 in the image area 31, are extracted and fed to an invalid pattern assessor 21 (the second information generating means). In this embodiment, the picture element p0 is disposed in the center and the picture elements p1 through p8 are arranged serially counterclockwise about p0. The data on picture element p0, latched by the latch circuit 11, is fed to an invalid pattern histogram generator 22 (histogram generating means) and a brightness histogram generator stage (first information generating means).

Figure 1:
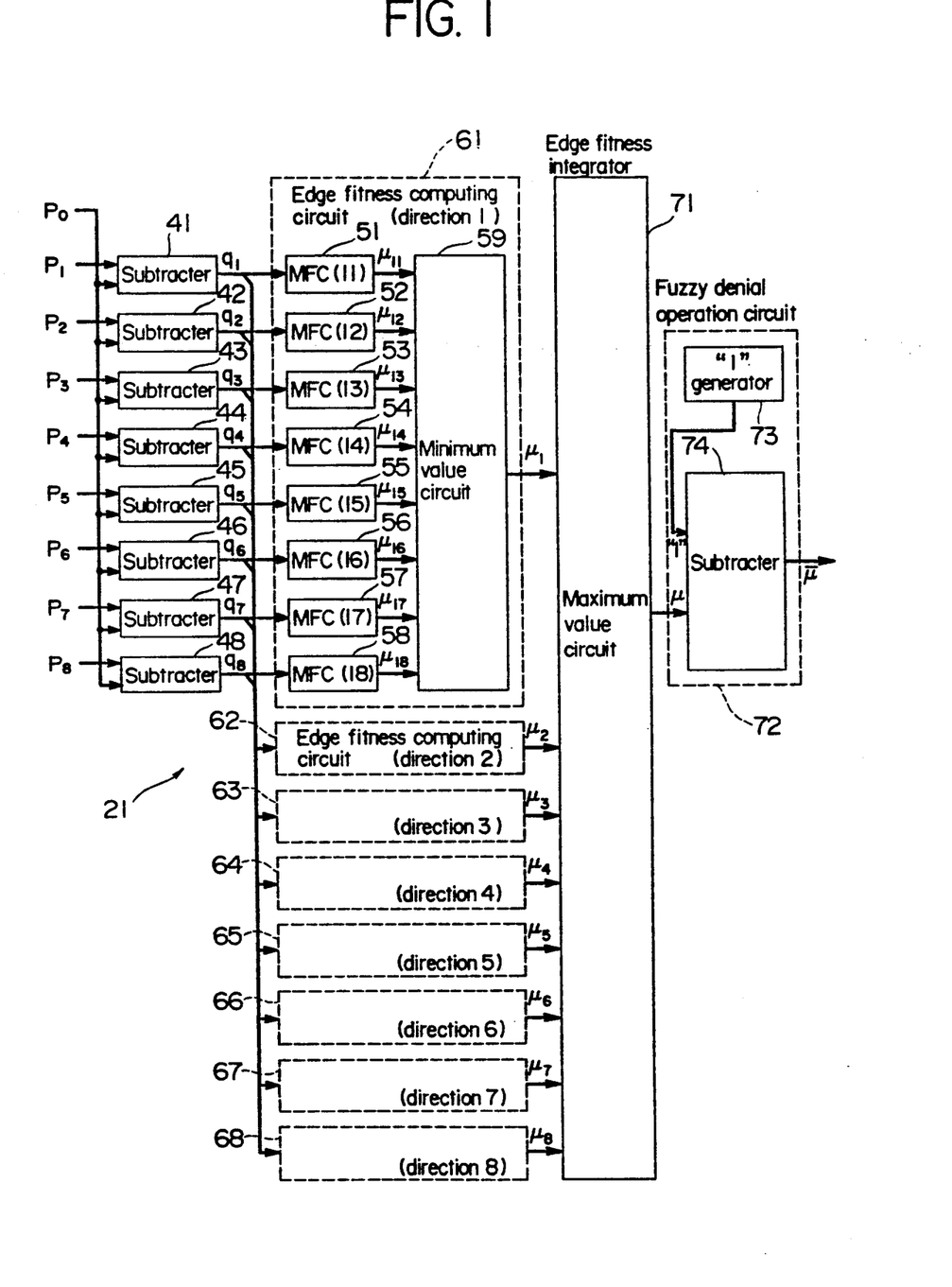
FIG. 1 is a block diagram showing the configuration of an example of the invalid pattern assessor.

The invalid pattern assessor 21 may for example be configured s illustrated in FIG. 1.

Subtracters 41 to 48 (pattern generating means) receive not only the data on picture elements p1 through p8 but also the data on picture element p0. The subtracters 41 through 48 calculate the brightness differences q1 through q8 between respective picture elements p1 through p8 and picture element p0 and output them to edge fitness calculators 61 through 68.

Figure 4:
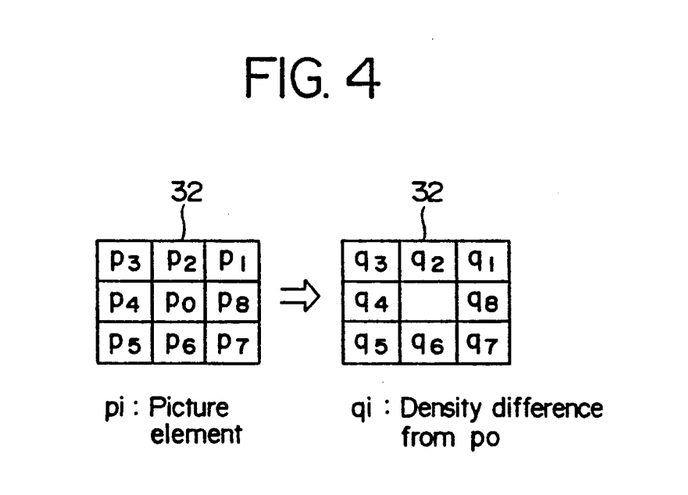
FIG. 4 is a diagram of picture elements in the window for explaining the operation of the subtracter shown in FIG. 1.

Referring to FIG. 4, the subtracters 41 through 48 using the picture element p0 disposed centrally in the window 32 as a reference generate a pattern of the brightness values q1 through q8 of the surrounding eight picture elements p1 through p8.

An edge fitness computing circuit indicated at 61 comprises membership function circuits (MFC) 51 through 58 (non-fitness information generating means) and a minimum value circuit 59 which selects the minimum of their output values, and the outputs q1 through q8 of said subtracters 41 through 48 are fed to these MFC 51 through 58, respectively. The MFC 51 through 58 have as stored therein the membership functions corresponding to respective locations of picture elements within the window 32 according to edge-direction fuzzy models and execute operations corresponding to the membership functions.

Figure 5:
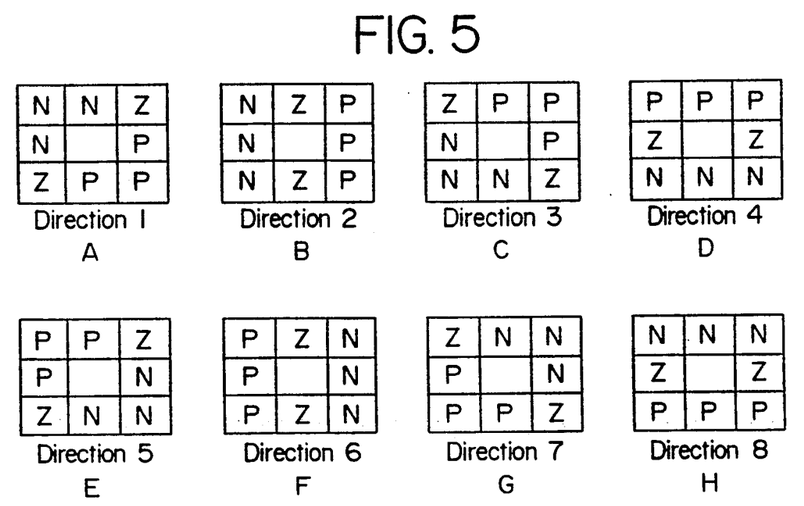
FIG. 5 is an elementary diagram showing the edge pattern of the fuzzy model in the MFC shown in FIG. 1.

Thus, as illustrated in FIG. 5, MFC 51 through 58 each has as stored therein a membership function Z, N or P according to the fuzzy model for the edge in direction 1 to the right at an angle of 45 degrees. More particularly, the MFC 51 and 55 corresponding to picture elements p1 and p5 (brightness differences q1 and q5), respectively, have as stored therein the member function Z, and the MFC 52 through 54 corresponding to picture elements p2 through p4 (brightness differences q2 and q4) have as stored therein the membership function N, and the MFC 56 through 58 corresponding to picture elements p6 through p8 (brightness differences q6 and q8) have as stored therein the membership function P.

Figure 6:
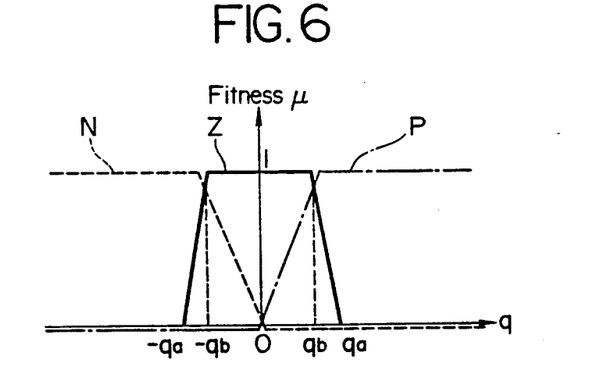
FIG. 6 is an input-output characteristic diagram of the membership functions in the MFC of FIG. 1.

The membership functions N, Z and P have the input-output characteristics shown in FIG. 6.

Thus, as shown by the broken lines, the membership function N sets the degree of fitness $\mu$ ($\mu 11$ through $\mu 18$) at the maximum value of 1 when the brightness difference q (q1 through q8) is smaller than $-qb$, the minimum value of 0 when q is larger than 0, and an intermediate value between 1 and 0 when q is a value between $-qb$ and 0.

The membership function p sets the degree of fitness $\mu$ at the minimum value of 0 when the brightness q is smaller than 0, the maximum value of 1 when q is larger than qb, and a corresponding value intermediate between 0 and 1 when q is intermediate between 0 and qb.

The membership function Z sets the degree of fitness $\mu$ at the minimum value of 0 when the absolute value of brightness q is larger than qa and at the maximum value of 1 when the absolute value is smaller than qb. And when the absolute value of brightness q is larger than qb and smaller than qa, the degree of fitness $\mu$ is set at an intermediate value between 1 and 0 according to the absolute value of q.

Thus, MFC 51 through 58 using the stored membership function N, Z or P as a reference, calculate the degrees of fitness $\mu 11$ through $\mu 18$ from the q1 through q8 supplied from the corresponding subtracters 41 through 48. The larger this value of fitness $\mu 11$ (the closer to 1), the more appropriate is the binary image obtainable by binarization of the data on picture element p1 using the brightness of picture element p0 as the reference. The same applies to picture elements p2 through p8.

The minimum value circuit 59 selects the minimum of the degrees of fitness $\mu 11$ through $\mu 18$ supplied from MFC 51 through 58 and the edge fitness computing circuit 61 outputs the degree of fitness $\mu 1$. Thus, selecting the smallest of the fitness values $\mu 11$ through $\mu 18$ obtained by binarization of respective picture elements p1 through p8 within the window 32 using the brightness of picture element p0 as a reference is nothing but determining the minimum degree of fitness which can be obtained by binarization using the brightness of picture element p0 as the standard.

The edge fitness computing circuits 62 through 68 are identical in configuration with the edge fitness computing circuit 61 but, as shown in FIG. 5B through H, the membership function fuzzy models stored in the MFCs are relevant to the edges in the directions 2 through 8, respectively. The edge directions 2 through 8 correspond to up, left 45° up, left horizontal, left 45° down, down, right 45° down, and right horizontal, respectively.

The maximum value circuit 71 selects the largest of the fitness values $\mu 1$ through $\mu 8$ supplied from the edge fitness value computing circuits 61 through 68 and outputs the fitness value $\mu$: Thus, since the edge fitness value computing circuits 61 through 68 select the largest of the minimum fitness values available when the edge direction (image pattern) within the window 32 is lined up with directions 1 through 8 (preset pattern), the fitness value $\mu$ is the fitness value in the most valid of all the directions 1 through 8.

The fitness value $\mu$ outputted from the maximum value circuit 71 is fed to a subtracter 74 of a fuzzy denial operation circuit 72 (non-fitness information generating means). Applied to the other input terminal of said subtracter 74 is a fuzzy logic value of 1 from a "1" generator 73 and the subtracter 74 outputs the value $\mu$ which is 1 minus the fitness value $\bar{\mu}$.

$$\bar{\mu}(=1-\mu)$$

Thus, $\bar{\mu}$ represents the degree of non-fitness (degree of invalidity) of the most valid pattern.

The above processing is repeated as a window scanner 17 (window scanning means) comprising an address generator 3, image memory 8, latch circuits 9 through 14 and 1H delay circuits 15, 16 scans the entire image area 31 illustrated in FIG. 3.

The invalid pattern histogram generator 22 cumulatively adds up the invalidity values $\mu$ at respective scanning positions of the window 32 according to the brightness of respective reference picture elements p0 to generate a histogram of invalidity. The brightness histogram generator 23 cumulatively adds up the number of reference picture elements p0 according to brightness and generates a histogram of brightness of all the picture elements within the whole image area.

Figure 7:
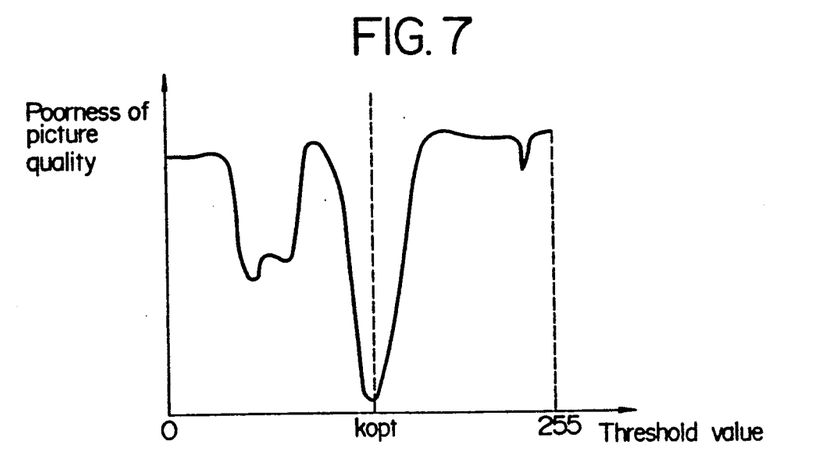
FIG. 7 is a picture quality histogram generated in the picture quality histogram generator.

The picture quality histogram generator 24 (third information generating means) divides the cumulative brightness value output from the invalid pattern histogram generator 22 by the cumulative value output for the corresponding brightness from the brightness histogram generator 23 for normalization to give a picture quality histogram as illustrated in FIG. 7.

Referring to FIG. 7, the horizontal axis represents brightness and the vertical axis represents poorness (invalidity) of picture quality as a criterion of picture quality. Therefore, the poorness of picture quality is minimized when binarization is carried out using the brightness $K_{opt}$ giving the bottom value (negative peak) in FIG. 7 as a reference (threshold value). The optimal threshold searcher 25 (optimal threshold value computing means) searches for the brightness (threshold value) giving the bottom value of the picture quality histogram generated by the picture quality histogram generator 24 and outputs the threshold value to CPU 1. The CPU 1 using the input threshold value as the reference binarizes the brightness values of all picture elements in the entire image area 31 to generate a binary image.

The above processing is now explained using fuzzy logic operational formulas.

Thus, the operation in the invalid pattern assessor 21 shown in FIG. 1 can be expressed by $$\bar{\mu} = 1 - \stackrel{v}{\underset{j}{\wedge}}(\stackrel{\wedge}{\underset{i}{}}(\mu_{ji}(q_i)))$$

where qi represents the brightness difference (q1 through q8) and $\mu_{ji}$ (qi) represents the membership function (N, Z, P) of the fuzzy label corresponding to picture element location i in direction j in the fuzzy model of FIG. 5 (i.e. MFC 51 through 58).

$\hat{i}$ represents the arithmetic operation for determining the minimum value available on change of i (processing in the minimum value circuit 59), and $$\stackrel{v}{\underset{j}{}}$$

represents an arithmetic operation for determining the maximum value available on change of j (processing in the maximum value circuit 71).

Similar results can also be obtained when the calculation of the minimum value or the maximum value according to formula (1) is arranged to satisfy the condition of t norm or t conorm.

The operation in the invalid pattern histogram generator 22 can be expressed by the following formula.

$$f \, hist \, (p0) = f \, hist \, (p0) + \bar{\mu} \quad (2)$$

Here, f hist (p0) represents the possibility of occurrence of an invalid pattern of brightness (threshold value) of picture element p0. The insertion of the identical term f hist (p0) on the right and left sides of the formula is intended to add the degree of invalidity $\mu$ to provide a new value.

Furthermore, the operation in the picture quality histogram generator 24 can be expressed by the following formulas.

When hist (k)=0, $$q \, hist \, (k) = Q0 \quad (3)$$

When hist (k)$\neq$0, $$q \, hist \, (k) = Q0 \times (f \, hist \, (k)/hist \, (k)) \quad (4)$$

Here, hist (k) is the brightness histogram which is generated in the brightness histogram generator 23 and q hist (k) is the picture quality histogram which is generated in the picture quality histogram generator 24.

$Q_0$ is the maximum value (a constant).

The above embodiment, however, involves the following problems.

1) It is difficult to set the optimal membership functions.

2.) There are cases in which an image other than the image that ought to be binarized is also binarized.

Figure 8:
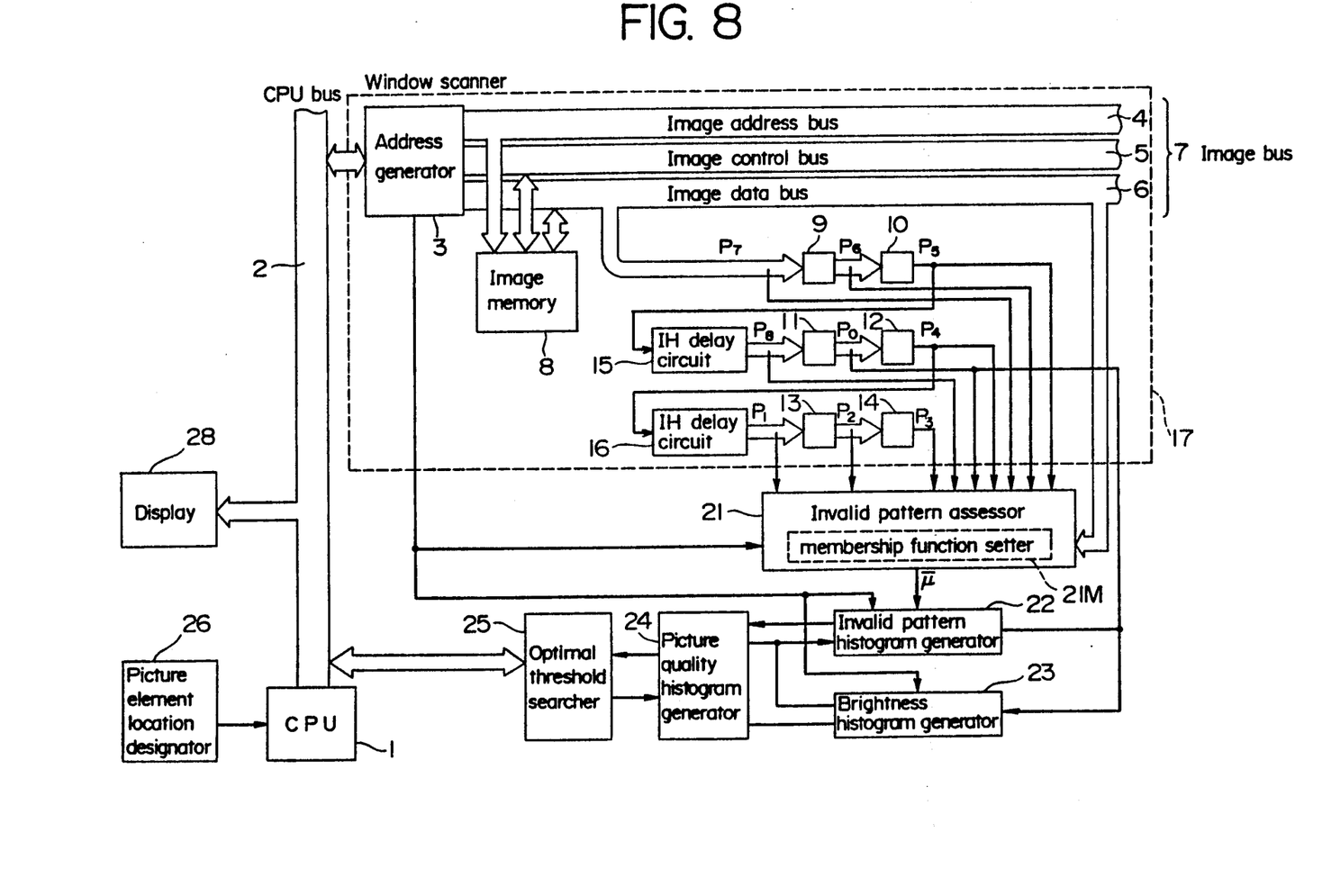
FIG. 8 is a block diagram showing the configuration of another example of the image binarization threshold calculator of the invention.
Figure 9:
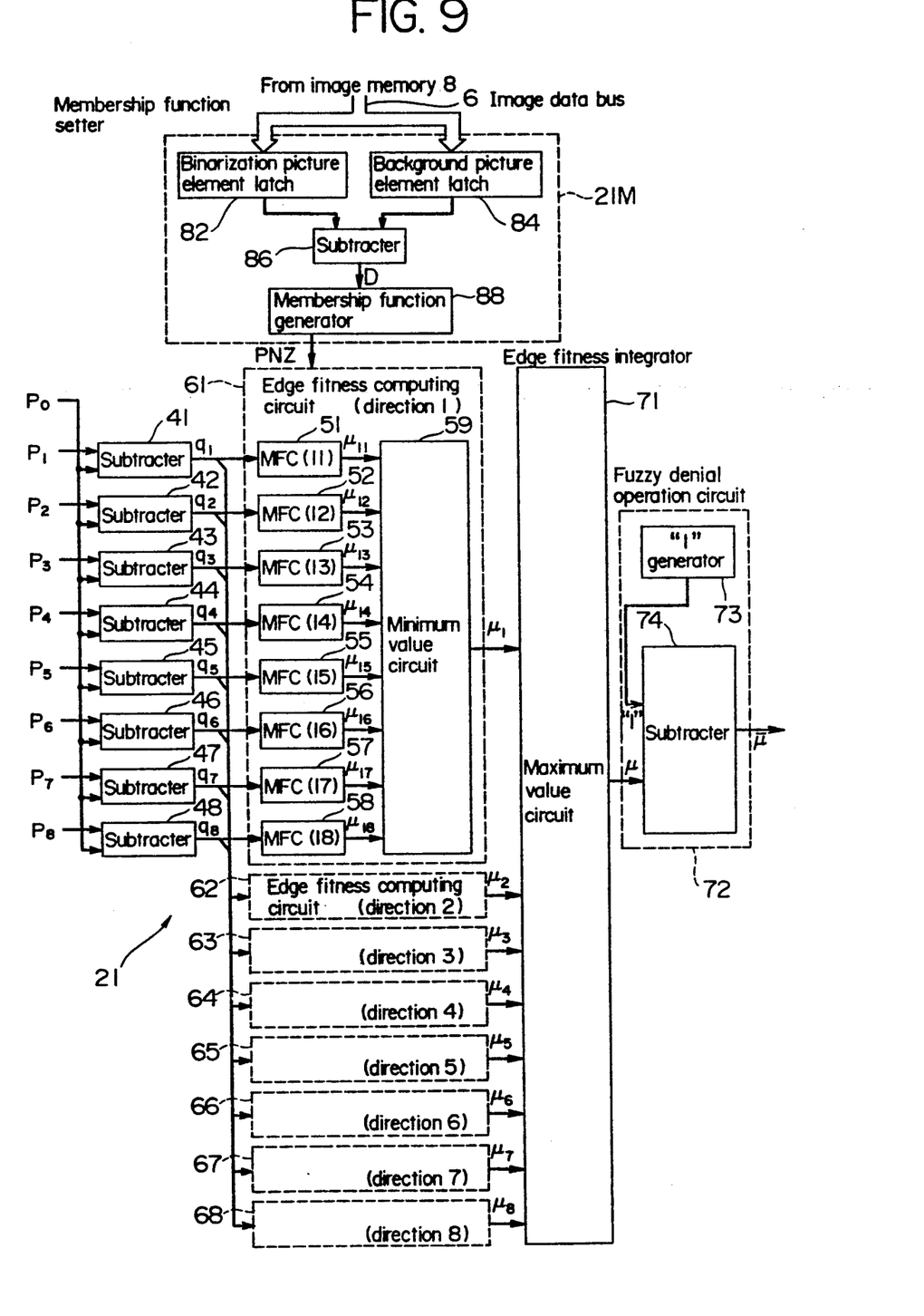
FIG. 9 is a block diagram showing the configuration of an example of the invalid pattern assessor in the embodiment of FIG. 8.

To avoid these problems, the systems illustrated in FIGS. 8 and 9 can be employed. In the system shown in FIG. 8, there is provided a picture element designator 26, with which the picture elements to be processed can be instructed to the CPU 1. Moreover, a display device 28 is provided for display the image being processed. The remainder of the construction is identical with that shown in FIG. 2.

In the system shown in FIG. 9, a membership function setter 21M is added to the embodiment shown in FIG. 1.

Figure 10:
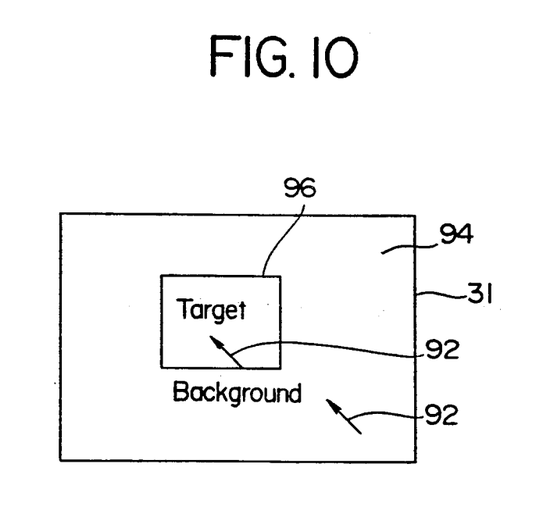
FIG. 10 is an elementary diagram for explaining the procedure of designating the binarization picture element and background element in the embodiment shown in FIG. 8.

The membership functions P, N and Z are set by said membership function setter 21M. This membership function setter 21M comprises a binarization picture element latch 82, a background picture element latch 84, a subtracter 86 and a membership function generator 88. The binarization picture element latch 82 functions as follows. As shown in FIG. 10, as the user manipulates the picture element designator 26, which may be a mouse, to designate a picture element with the aid of a cursor 92 in the image area 96 to be binarized on a screen 31 of said display unit 28, the multilevel image data representing the brightness of the designated picture element is outputted from the image memory 8 under control of CPU 1, whereupon said latch 82 latches the above multilevel image data according to a timing signal from the address generator 3.

The background picture element latch 84 functions as follows. Thus, as the user manipulates the picture element designator 26 to designate a location with the aid of a cursor 92 within the multilevel background image area 94 on the screen 31 as shown in FIG. 10, the multilevel image data representing the brightness of the picture element at the designated location is outputted from the image memory 8 under control of CPU 1, whereupon said background latch 84 latches the above multilevel image data according to a timing signal from the address generator 3.

Figure 11:
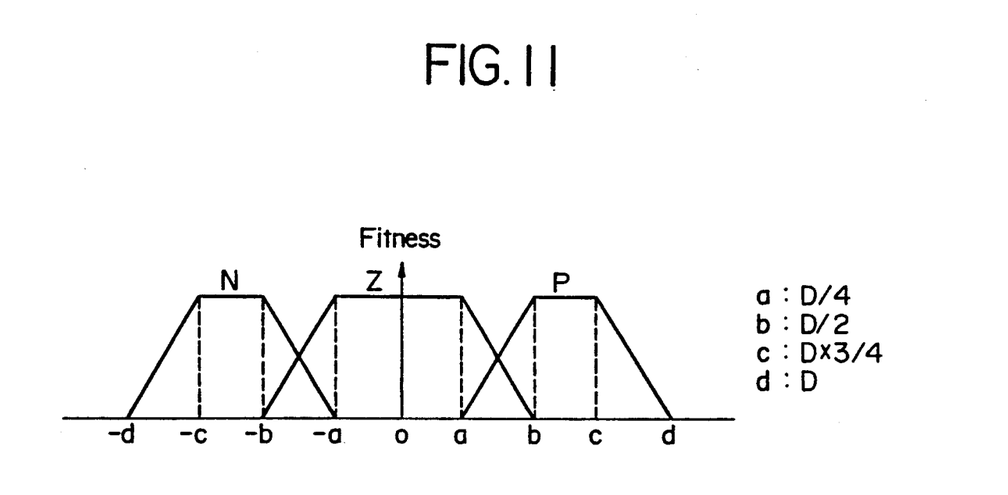
FIG. 11 is an elementary diagram explaining the membership functions in the embodiment shown in FIG. 8.

The subtracter 86 supplies the difference between the image data outputs of said binarization picture element latch 82 and background picture element latch 84, that is to say the difference D is brightness between the picture element to be binarized and the background picture element, to a membership function generator 88. This circuit 88 in response to this input generates membership functions N, P and Z. These membership functions have the input-output characteristics shown in FIG. 11. In FIG. 11, $a = D/4$, $b = D/2$, $C = D \times \frac{3}{4}$, and $d = D$.

As shown in FIG. 11, the membership function N sets the fitness value $\mu$ ($\mu 11$ through $\mu 18$) at the minimum value of 0 when the brightness difference q (q1 through q8) is smaller than $-d$, at a value increasing linearly according to q within the range of $0 < \mu < 1$ when $-d \leq q < -c$, at the maximum value of 1 when $-c \leq q < -b$, at a value decreasing linearly according to q within the range of $0 < \mu < 1$ when $-b \leq q < -a$, or at the minimum value of 0 when $-a \leq q$, as shown in FIG. 11.

The membership function P, also as shown in FIG. 11, sets the fitness value $\mu$ at the minimum value of 0 when $q < a$, at a value increasing linearly according to q within the range of $0 < \mu < 1$ when $a \leq q < b$, at the maximum value of 1 when $b \leq q < c$, at a value decreasing linearly according to q within the range of $0 < \mu < 1$ when $c \leq q < d$, or at the minimum value of 0 when $d \leq q$.

The membership function Z, also as shown in FIG. 11, sets $\mu$ at the minimum value of 0 when $q < -b$, at a value increasing linearly according to q within the range of $0 < \mu < 1$ when $-b \leq q < -a$, at the maximum value of 1 when $-a \leq q < a$, at a value decreasing linearly according to q within the range of $0 < \mu < 1$ when $a \leq q < b$, or at the minimum value of 0 when $b \leq q$.

Since the membership functions are set automatically according to the difference in brightness between the designated picture element and the background element, the optimal membership functions can be easily set and, moreover, chances for binarization of image data other than those, which are to be binarized are eliminated.

Thus, in accordance with the image binarization threshold computing apparatus of the present invention, not a binary validity assessment against a model of, for example, the picture edge but a fitness (non-fitness) evaluation covering intermediate information is performed so that a smooth picture quality histogram can be obtained. Accordingly, smoothing operation can be dispensed with and a delicate threshold value detection is made feasible. Furthermore, the variation of the picture quality histogram on every incorporation of even the same image data in an image memory is inhibited.

The above description and the accompanying drawings are merely illustrative of a few modes of application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. An apparatus for computing an image binarization threshold value, said apparatus comprising:
   a window scanning means for setting a window of predetermined area over a multilevel image and scanning the same image,
   a first information generating means for receiving image data from said window scanning means and for generating therefrom a first data indicative of brightness of the image within said window,
   a second information generating means for receiving image data from said window scanning means and for generating therefrom a second data indicative of the fitness of non-fitness of the image within said window with respect to a preset fuzzy image edge model data, said second information generating means comprising:
   a pattern generating means which, using the brightness of a picture element at a predetermined location of the image within said window as a reference, generates a brightness pattern of other neighboring picture elements within said window,
   fitness or non-fitness data generating means for generating data concerning the fitness or non-fitness of said brightness pattern with respect to a fuzzy image edge model constructed by combination of a plurality of membership functions corresponding to the locations of said neighboring picture elements within said window, and
   a histogram generating means for generating a histogram of said fitness or non-fitness data,
   a third information generating means for receiving said first and second data and generating therefrom a third data serving as a picture quality assessment criterion, and
   an optimal threshold computing means for receiving said third data and calculating therefrom an optimal threshold value providing the best picture quality.

2. An apparatus according to claim 1, which further comprises a membership function setting means for setting said membership functions according to a difference in brightness between a target picture element and a background picture element.

3. An apparatus according to claim 2 which further comprises a manual designating means for designating said target and background picture elements.

4. An apparatus for computing an image quality assessment criterion, said apparatus comprising:
   a window scanning means for setting a window of predetermined area over a multilevel image and scanning the same image,
   a first information generating means for receiving image data from said window scanning means and for generating therefrom a first data indicative of brightness of the image within said window,
   a second information generating means for receiving image data from said window scanning means and for generating therefrom a second data indicative of the fitness of non-fitness of the image within said window with respect to a preset fuzzy image edge model data, said second information generating means comprising:

a pattern generating means which, using the brightness of a picture element at a predetermined location of the image within said window as a reference, generates a brightness pattern of other neighboring picture elements within said window, fitness or non-fitness data generating means for generating data concerning the fitness or non-fitness of said brightness pattern with respect to a fuzzy image edge model constructed by combination of a plurality of membership functions corresponding to the locations of said neighboring picture elements within said window, and a histogram generating means for generating a histogram of said fitness of non-fitness data, and a third information generating means for receiving said first and second data and generating therefrom a third data serving as a picture quality assessment criterion.

* * * * *